(12) United States Patent
Lee et al.

(10) Patent No.: US 12,220,746 B2
(45) Date of Patent: Feb. 11, 2025

(54) METHOD FOR PREPARING GOLD NANORODS USING REDUCING AGENT MIXTURE AND REDUCING AGENT MIXTURE FOR SAME

(71) Applicant: INDUSTRY-UNIVERSITY COOPERATION FOUNDATION HANYANG UNIVERSITY ERICA CAMPUS, Gyeonggi-do (KR)

(72) Inventors: Seunghyun Lee, Gyeonggi-do (KR); Sunghoon Yoo, Gyeonggi-do (KR)

(73) Assignee: INDUSTRY-UNIVERSITY COOPERATION FOUNDATION HANYANG UNIVERSITY ERICA CAMPUS, Gyeonggi-do (KR)

( * ) Notice: Subject to any disclaimer, the term of this patent is extended or adjusted under 35 U.S.C. 154(b) by 0 days.

(21) Appl. No.: 18/088,415

(22) Filed: Dec. 23, 2022

(65) Prior Publication Data
US 2023/0405675 A1 Dec. 21, 2023

(30) Foreign Application Priority Data
Jun. 15, 2022 (KR) ........................ 10-2022-0072897

(51) Int. Cl.
B22F 9/24 (2006.01)
B22F 1/0545 (2022.01)
B82Y 40/00 (2011.01)

(52) U.S. Cl.
CPC ............. B22F 9/24 (2013.01); B22F 1/0545 (2022.01); *B22F 2301/255* (2013.01); *B22F 2303/01* (2013.01); *B22F 2304/05* (2013.01); *B82Y 40/00* (2013.01)

(58) Field of Classification Search
None
See application file for complete search history.

(56) References Cited

U.S. PATENT DOCUMENTS

| 2012/0235095 A1* | 9/2012 | Vigderman ............ B82Y 40/00 977/777 |
| 2014/0234157 A1* | 8/2014 | Chen ........................ B22F 9/24 427/125 |
| 2019/0166699 A1* | 5/2019 | Markovich ............ H05K 3/244 |

(Continued)

FOREIGN PATENT DOCUMENTS

| CN | 109396457 A | * | 3/2019 |
| CN | 111659903 A | * | 9/2020 |
| JP | 2013233101 A | * | 11/2013 |

(Continued)

OTHER PUBLICATIONS

English translation of JP 2013233101 (originally published Nov. 21, 2013), obtained from PE2E search.*

(Continued)

*Primary Examiner* — George Wyszomierski

(57) ABSTRACT

Provided is a method for preparing gold nanorods using a reducing agent mixture, which includes: a step of preparing a seed solution containing the seed particles of gold nanoparticles; and a step of growing the seeds of the gold nanoparticles into nanorods by adding a growth solution containing ascorbic acid (AA) and hydroquinone (HQ) to the prepared seed solution, wherein the ascorbic acid first reduces the seeds of the gold nanoparticles.

5 Claims, 11 Drawing Sheets

(56) References Cited

U.S. PATENT DOCUMENTS

2019/0284366 A1  9/2019  Ozturk et al.

FOREIGN PATENT DOCUMENTS

JP           6461262      1/2019
KR    10-2015-0114603    10/2015
TW           I648099      1/2019

OTHER PUBLICATIONS

English translation of CN 109396457 (originally published Mar. 1, 2019), obtained from PE2E search.*
English translation of CN 111659903 (originally published Sep. 15, 2020), obtained from PE2E search.*
Nikhil R. Jana et al., Wet Chemical Synthesis of High Ratio Cylindrical Gold Nanorods, J. Phys. Chem. B, vol. 105, No. 19, pp. 4065-4067, Apr. 21, 2001.

* cited by examiner

METHOD FOR PREPARING GOLD NANORODS USING REDUCING AGENT MIXTURE AND REDUCING AGENT MIXTURE FOR SAME

CROSS-REFERENCE TO RELATED APPLICATION

This application claims priority of Korean Patent Application No. 10-2022-00772897, filed on Jun. 15, 2022, in the KIPO (Korean Intellectual Property Office), the disclosure of which is incorporated herein entirely by reference.

BACKGROUND OF THE INVENTION

Field of the Invention

The present disclosure relates to a method for preparing gold nanorods using a reducing agent mixture and a reducing agent mixture for the same, more particularly to a method for preparing gold nanorods using a reducing agent mixture, which allows the control of the aspect ratio of the gold nanorods using a combination of reducing agents having different reducing powers, and a reducing agent mixture for the same.

Description of the Related Art

Gold nanoparticles are being researched extensively as precious metal nanoparticles for applications including biosensors, photocatalysts, cancer therapy, drug delivery and antibacterial activities.

In addition, gold nanoparticles are utilized in various analytical methods such as surface-enhanced Raman scattering, etc. owing to the superior biocompatibility, antioxidant property and target specificity, easy surface modification, etc. of the gold nanoparticles.

Particularly, the photothermal and photoacoustic characteristics of gold nanoparticles including the localized surface plasmon resonance (LSPR) effect suggest the applicability of the gold nanoparticles in thermal therapy and various medical imaging applications.

Accordingly, it is important to control the shape and size of gold nanoparticles for control of localized surface plasmon resonance (LSPR), improvement of photothermal and photoacoustic characteristics and utilization of light of various wavelengths, particularly in the near-infrared region. Among Au nanoparticles of various shapes, gold (Au) nanorods are drawing attentions because they resonate both longitudinally and transversely according to their length and diameter. In addition, the LSPR spectrum of the gold (Au) nanorods may be shifted to the near-infrared (NIR) spectrum by adjusting the aspect ratio.

Therefore, researches are being conducted actively on the control of the aspect ratio of gold nanorods. It is because the increase in the aspect ratio leads to the increase of maximum SPR absorption ($\Delta\lambda_{max}$).

As one of the methods for controlling the aspect ratio, seed-mediated synthesis of gold nanorods has been presented by Jana et al. (N. R. Jana, L. Gearheart, C. J. Murphy, "Wet Chemical Synthesis of High Aspect Ratio Cylindrical Gold Nanorods" Phys. Chem. B 105, 4065 (2001)).

In this method, Au seed particles with a size of 2-3 nm are synthesized and then grown into Au nanorods in a growth solution. Sodium borohydride (NaBH) is used as a reducing agent and no additional reagent is necessary for the formation of seed particles. As a result, since the seed particles exist in the growth solution, they can be grown to gold (Au) nanorods by using a relatively weak reducing agent. The control of the aspect ratio of the gold (Au) nanorods depends on the reducing agent used in the growth solution, and the rate of the reduction of Au ions during the growth step depends on the reducing power of the reducing agent.

However, a method that allows the control of aspect ratio and the control of UV-VIs NIR absorption spectrum, etc. through a combination of reducing agents having different reducing powers has not been disclosed.

SUMMARY OF THE INVENTION

The present disclosure is directed to providing a method that allows the control of aspect ratio and the control of UV-VIs NIR absorption spectrum, etc. through a combination of reducing agents having different reducing powers, and a reducing for the same.

The present disclosure provides a method for preparing gold (Au) nanorods using a reducing agent mixture, which includes: a step of preparing a seed solution containing the seed particles of gold nanoparticles; and a step of growing the seeds of the gold nanoparticles into nanorods by adding a growth solution containing ascorbic acid (AA) and hydroquinone (HQ) to the prepared seed solution, wherein the ascorbic acid first reduces the seeds of the gold nanoparticles.

In an exemplary embodiment of the present disclosure, the ascorbic acid (AA) disappears as it reacts earlier than the hydroquinone (HQ).

In an exemplary embodiment of the present disclosure, the amount of the ascorbic acid is insufficient to reduce all the gold nanoparticles.

In an exemplary embodiment of the present disclosure, the aspect ratio of the gold nanorods is increased as the amount of the hydroquinone is increased.

In an exemplary embodiment of the present disclosure, the seed solution is a solution in which the seeds are formed by adding $HAuCl_4$, CTAB and $NaBH_4$.

In an exemplary embodiment of the present disclosure, the aspect ratio of the gold nanorods is higher than that of the gold nanorods grown by using ascorbic acid or hydroquinone alone.

The present disclosure also provides gold nanorods prepared by the method described above.

In an exemplary embodiment of the present disclosure, the gold nanorods have an aspect ratio of 7 or higher.

The present disclosure also provides a reducing agent for preparing gold nanorods, which includes ascorbic acid and hydroquinone at the same time.

In an exemplary embodiment of the present disclosure, the reducing agent is a reducing agent used in the method for preparing gold nanorods described above.

According to the present disclosure, a combination of reducing agents having different reducing powers is used in the step of growing gold (Au) nanorods. Ascorbic acid (AA) has a relatively stronger reducing power than hydroquinone (HQ). Accordingly, since sufficient time for growth of gold (Au) nanorods can be provided when using hydroquinone (HQ), the aspect ratio of the gold (Au) nanorods can be controlled easily.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
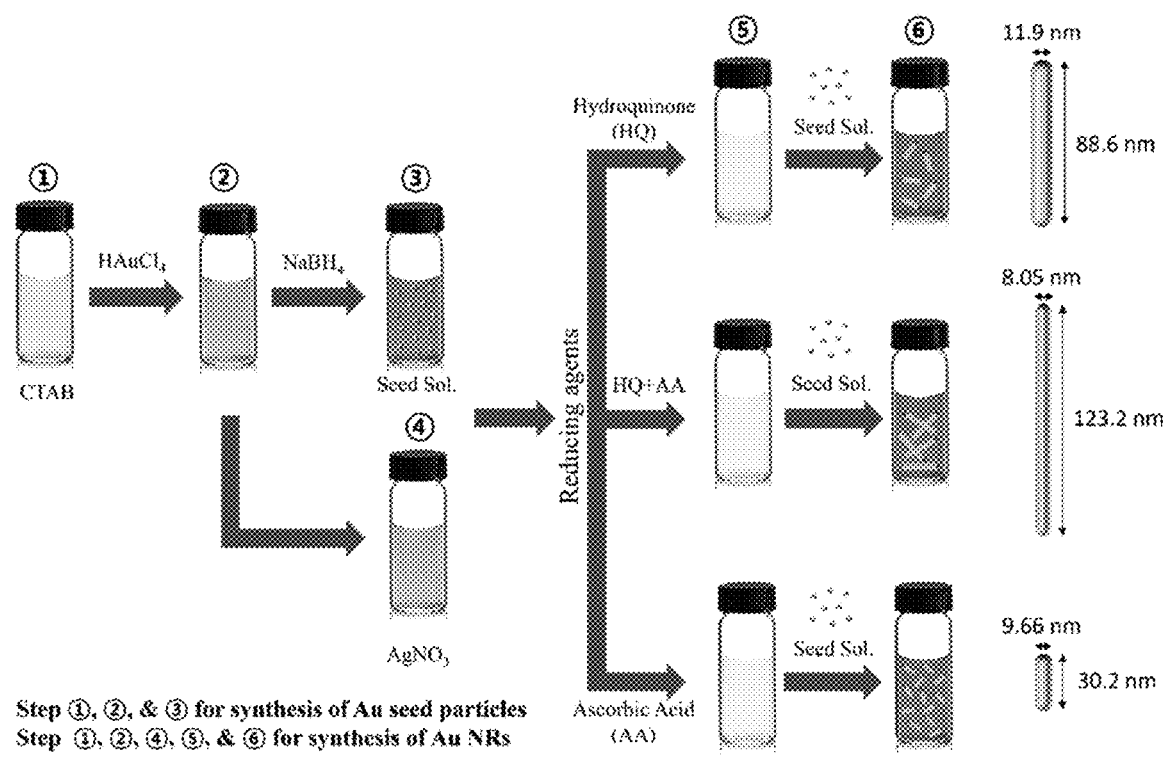
FIG. 1 schematically illustrates a synthesis method according to an exemplary embodiment of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

In the present disclosure, gold (Au) nanorods are synthesized using a reducing agent mixture, which is a combination of ascorbic acid (AA) and hydroquinone (HQ) as reducing agents.

That is to say, in the present disclosure, a combination of the reducing agents having different reducing powers is used during the growth step of the gold (Au) nanorods. Ascorbic acid (AA) has a relatively stronger reducing power than hydroquinone (HQ). Accordingly, since sufficient time for the growth of gold (Au) nanorods can be provided when hydroquinone (HQ) is used, the aspect ratio of the gold (Au) nanorods can be controlled easily.

On the contrary, if ascorbic acid (AA) is used, it is difficult to control the aspect ratio by controlling the content of the reducing agent because of fast reduction owing to stronger reducing power than that of hydroquinone (HQ). In contrast, gold (Au) nanorods are synthesized in the present disclosure by using a combination of the two reducing agents having different reducing powers. The synthesized Au nanorods exhibit a higher aspect ratio and more red-shifted $\lambda_{Lmax}$ as compared to those prepared by using ascorbic acid (AA) or hydroquinone (HQ) alone.

It is because Au ions are preferentially grown into Au nanorods by ascorbic acid (AA) initially and the remaining Au ions are grown into nanorods hydroquinone (HQ) during the growth step. Hereinafter, the present disclosure is described in more detail through an example and a test example.

Example

Synthesis of Gold Seed Particles

After adding 0.5 mL of 0.01 M HAuCl$_4$ to 9.5 mL of 0.1 M CTAB (cetrimonium bromide), a 0.01 M NaBH$_4$ solution was slowly added to the seed solution. Then, after the color of the seed solution turned from yellow to light brown, the seed solution was kept in a water bath maintained at 40° C. for at least 30 minutes and then used in the next step within 2-5 hours.

Synthesis of Gold Nanorods

A solution was prepared by mixing 9.5 mL of 0.1 M CTAB, 0.5 mL of 0.01 M HAuCl$_4$ and 0.05 mL of 0.1 M AgNO$_3$. When a reducing agent is further added to the solution, the solution becomes colorless due to the reduction of Au ions. Unless the solution becomes colorless, it means that the Au ions are not reduced completely.

The minimum contents of 100 mM HQ and 100 mM AA required to reduce Au$^{3+}$ to Au$^+$ were 300 and 70 µL, respectively. When the two reducing agents of the same concentration are mixed, Au nanorods will be grown by ascorbic acid (AA) only, because ascorbic acid (AA) has a relatively stronger reducing power than hydroquinone (HQ), and it may be difficult to identify the effect of the two reducing agents. Therefore, different amounts of ascorbic acid (AA) and hydroquinone (HQ) were used in this example.

Finally, after adding 160 µL of the prepared seed solution, the solution was kept in a water bath maintained at 40° C. Growth time varies depending on the contents of the reducing agents. The solution turns dark brown when the growth of Au nanorods is completed.

Comparative Examples

Au nanorods were synthesized using ascorbic acid (AA) or hydroquinone (HQ) alone as comparative examples. For ascorbic acid (AA), a growth solution was prepared by sequentially adding 4.75 mL of 0.1 M CTAB, 0.2 mL of 0.01 M HAuCl$_4$ and 0.03 mL of 0.01 M AgNO$_3$ and then adding 0.03 mL of 0.1 M AA. Finally, after adding 0.06 mL of an Au seed solution to the growth solution, the resulting solution was kept in a water bath maintained at 40° C. For hydroquinone (HQ), only hydroquinone (HQ) was used as the reducing agent.

Test Example

Selection of Reducing Agent

FIG. 1 schematically illustrates a synthesis method according to an exemplary embodiment of the present disclosure.

Referring to FIG. 1, spherical particles with a size of 2-3 nm were synthesized by reducing Au ions using NaBH$_4$, which is a powerful reducing agent, during the seed particle synthesis step. In contrast, Au nanorods were grown from the synthesized seed particles in the Au nanorod growth step using a weak reducing agent. It is necessary to select adequate reducing agents in order to synthesize Au nanorods with a desired aspect ratio in the growth step.

In the growth step, a reducing agent mixture of ascorbic acid (AA) and hydroquinone (HQ) according to the present disclosure was used as a reducing agent. When the reduction of Au$^{3+}$ to Au$^+$ was faster when Au nanorods were grown by using ascorbic acid (AA). Consequently, the growth rate of Au nanorods was faster than when hydroquinone (HQ) was used as the reducing agent.

Accordingly, relatively shorter Au nanorods were formed when ascorbic acid (AA) was used. In contrast, the reduction of Au ions occurred slowly when hydroquinone (HQ) was used and, accordingly, the growth rate of the Au nanorods was slow and longer Au nanorods were grown.

Figure 2A:
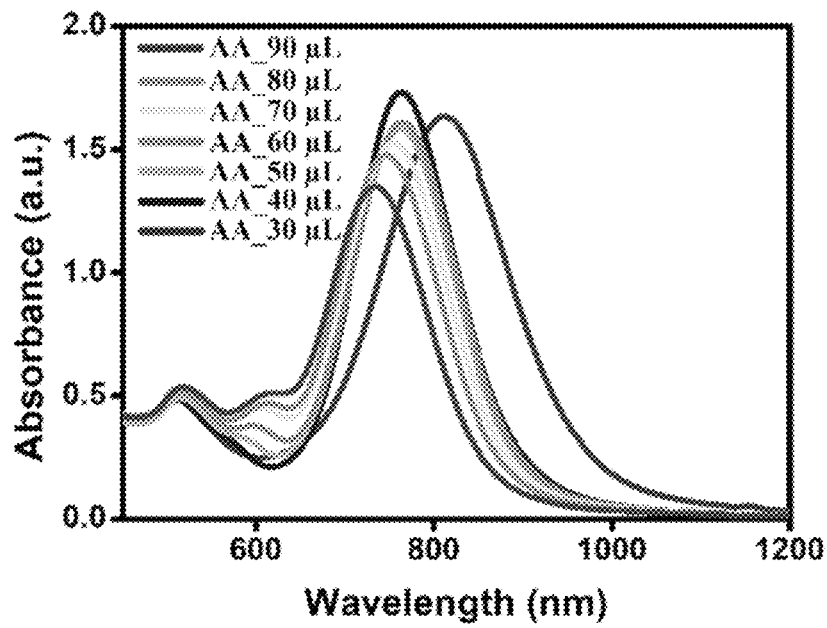
FIG. 2A shows the absorption spectra of gold (Au) nanorods synthesized by controlling the content of ascorbic acid (AA) as a reducing agent.
Figure 2B:
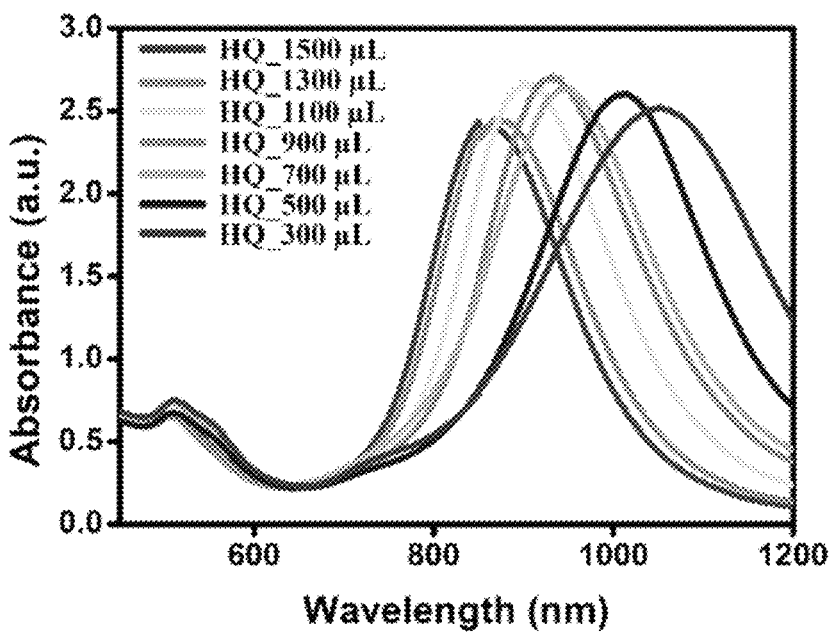
FIG. 2B shows the absorption spectra of gold (Au) nanorods synthesized by controlling the content of hydroquinone (HQ) as a reducing agent.
Figure 2C:
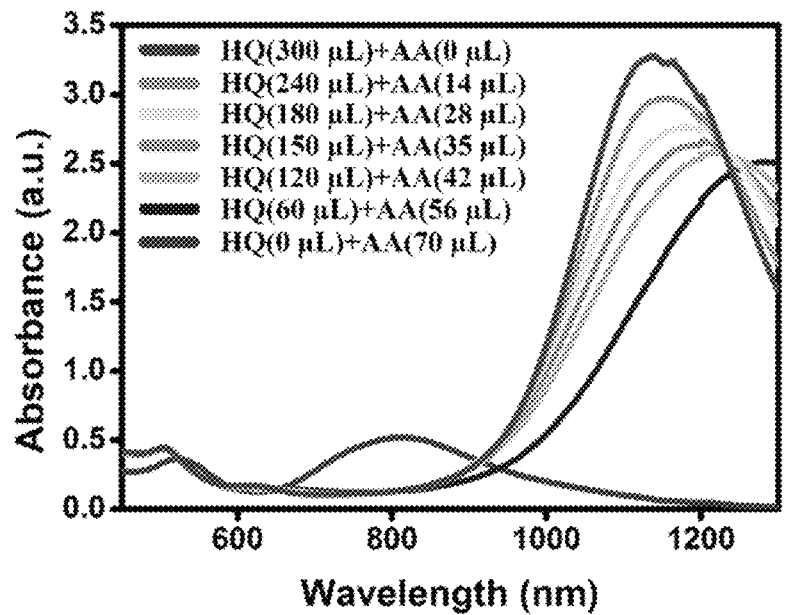
FIG. 2C shows the absorption spectra of gold (Au) nanorods prepared using combinations of hydroquinone (HQ) and ascorbic acid (AA) with different contents.

FIG. 2A shows the absorption spectra of the gold (Au) nanorods synthesized by controlling the content of ascorbic acid (AA) as the reducing agent, FIG. 2B shows the absorption spectra of the gold (Au) nanorods synthesized by controlling the content of hydroquinone (HQ) as the reducing agent, and FIG. 2C shows the absorption spectra of gold (Au) nanorods prepared using combinations of hydroquinone (HQ) and ascorbic acid (AA) with different contents.

The UV-Vis-NIR spectra of the Au nanorods synthesized with ascorbic acid (AA) and hydroquinone (HQ) of different contents are shown in FIGS. 2A and 2B.

In FIG. 2A, the $\lambda_{Lmax}$ of the Au nanorods was shifted from 734 nm up to 812 nm. The $\lambda_{Lmax}$ of 78 nm could be achieved only when the content of ascorbic acid (AA) was changed from 90 µL to 30 µL.

In contrast, in FIG. 2B, the $\lambda_{Lmax}$ was shifted greatly from 850 nm to 1066 nm ($\lambda_{Lmax}$=216) by changing the content of hydroquinone (HQ). The greater change of the $\lambda_{Lmax}$ when hydroquinone (HQ) was used as compared to when ascorbic acid (AA) was used may be due to the difference in the aspect ratios of the prepared Au nanorods.

In order to confirm this, the Au nanorods were analyzed by TEM. As a result, whereas the Au nanorods prepared by using ascorbic acid (AA) alone showed little change in length and diameter and exhibited a low aspect ratio (3.14), those prepared with hydroquinone (HQ) showed significant change in length and diameter and a high aspect ratio (7.43). That is to say, the increase in the aspect ratio of the Au nanorods when hydroquinone (HQ) is used as compared to that of the Au nanorods when ascorbic acid (AA) is used leads to increase of the $\lambda_{Lmax}$.

This is caused by the difference in the growth rate of Au nanorods resulting from the difference in the reducing power of the reducing agents. That is to say, because hydroquinone (HQ) is a weaker reducing agent as compared to ascorbic acid (AA), the rate of reduction from Au$^{3+}$ to Au$^+$ is decreased as the content of hydroquinone (HQ) is lower. Accordingly, the growth of Au nanorods occurs slowly and Au nanorods with a high aspect ratio, which can absorb light of a longer wavelength, is synthesized. If the content of hydroquinone (HQ) is increased, Au$^{3+}$ is rapidly reduced to Au$^+$ and sufficient time is not provided for the growth of Au nanorods. As a result, the $\lambda_{Lmax}$ is shifted toward a shorter wavelength.

This result shows that the growth of Au nanorods can be controlled with the reducing power of the reducing agent. That is to say, it was not difficult to control the $\lambda_{Lmax}$ when ascorbic acid (AA) was used and it was impossible to control the $\lambda_{Lmax}$ above 1066 nm when hydroquinone (HQ) was used. However, when both the reducing agents were used together, the $\lambda_{Lmax}$ could be controlled to up to 1250 nm.

FIG. 2C shows the UV-Vis-NIR absorption spectra of the Au nanorods prepared using combinations of hydroquinone (HQ) and ascorbic acid (AA) with different contents.

Figure 3A:
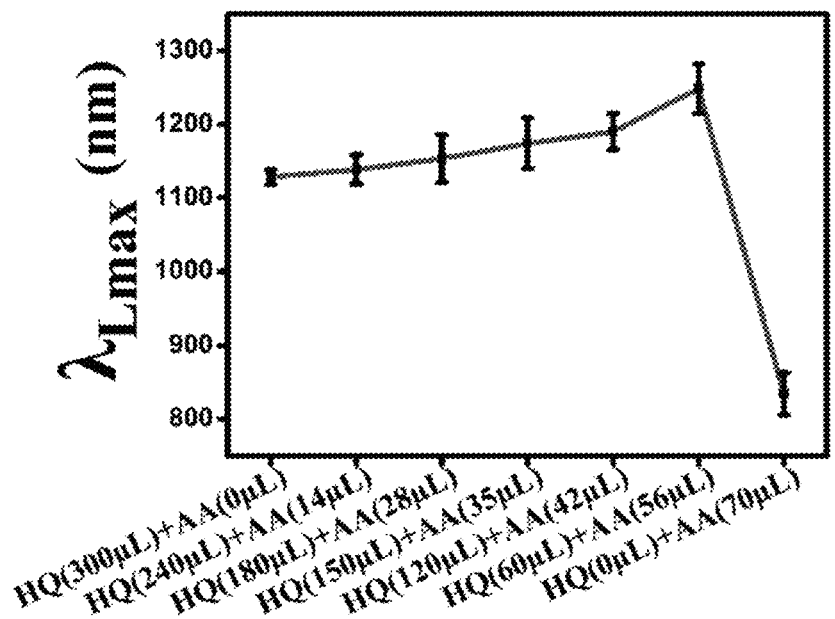
FIG. 3A shows the change of the $\lambda_{Lmax}$ in the UV-Vis-NIR absorption spectrum of gold (Au) nanorods depending on the contents of hydroquinone (HQ) and ascorbic acid (AA)
Figure 3B:
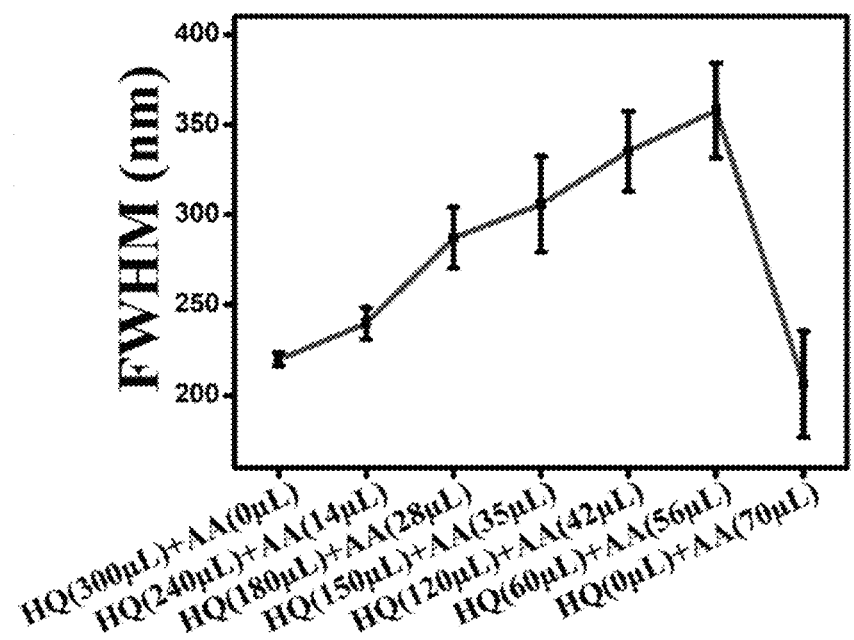
FIG. 3B shows the change of full width at half maximum (FWHM).

Referring to FIG. 2C, the red shift of the $\lambda_{Lmax}$ was observed as the ratio of ascorbic acid (AA) was increased in the reducing agent mixture. This can also be confirmed in FIG. 3A. FIG. 3A shows the change of the $\lambda_{Lmax}$ in the UV-Vis-NIR absorption spectrum of the Au nanorods depending on the contents of hydroquinone (HQ) and ascorbic acid (AA). FIG. 3B shows the change of full width at half maximum (FWHM) in the UV-Vis-NIR absorption spectrum of the Au nanorods depending on the contents of hydroquinone (HQ) and ascorbic acid (AA).

The full width at half maximum (FWHM) of the UV-Vis-NIR absorption spectrum, which represents the uniformity of particles, was increased as the ratio of ascorbic acid (AA) was increased (FIG. 3B). This is due to lower uniformity caused by faster reaction rate and higher ratio of the ascorbic acid (AA).

Figure 4:
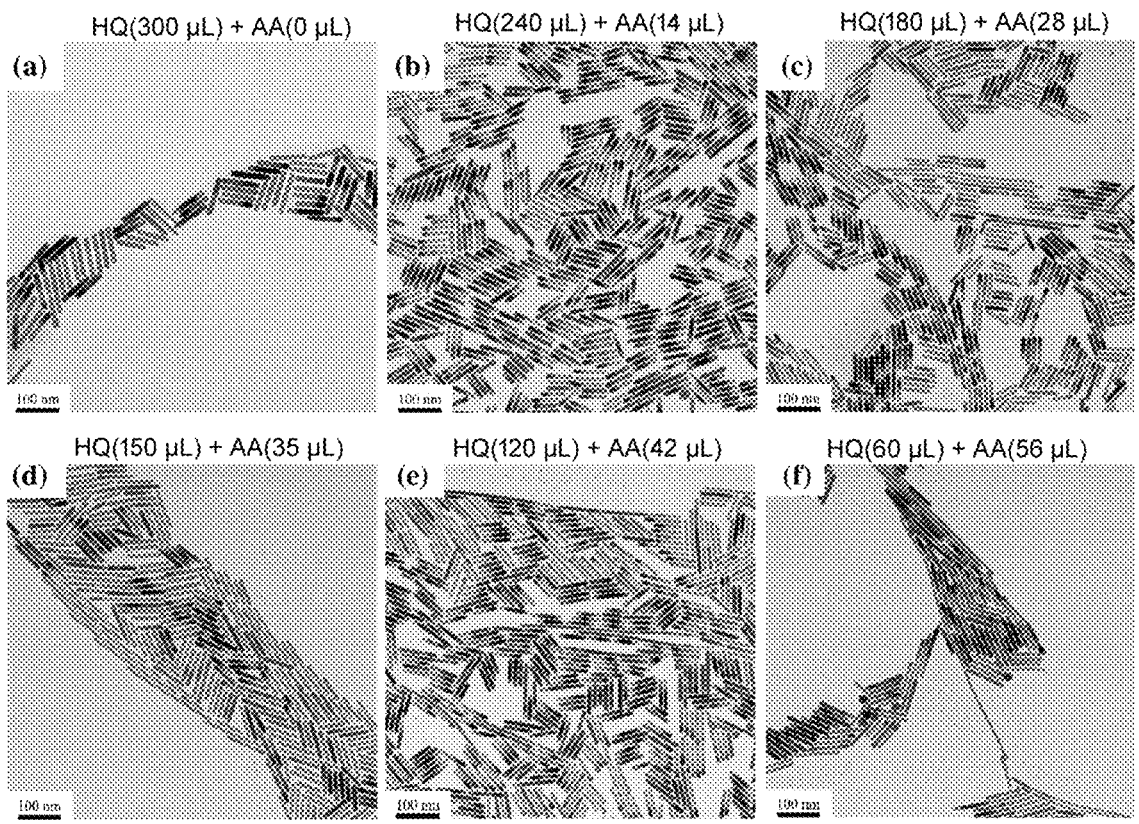
FIG. 4 shows the TEM images of gold (Au) nanorods prepared using mixtures of hydroquinone (HQ) and ascorbic acid (AA) at different contents: (a) HQ (300 μL)+AA (0 μL), (b) HQ (240 μL)+AA (14 μL), (c) HQ (180 μL)+AA (28 μL), (d) HQ (150 μL)+AA (35 μL), (e) HQ (120 μL)+AA (42 μL), (f) HQ (60 μL)+AA (56 μL).

FIG. 4 shows the TEM images of the gold (Au) nanorods prepared using mixtures of hydroquinone (HQ) and ascorbic acid (AA) at different contents: (a) HQ (300 μL)+AA (0 μL), (b) HQ (240 μL)+AA (14 μL), (c) HQ (180 μL)+AA (28 μL), (d) HQ (150 μL)+AA (35 μL), (e) HQ (120 μL)+AA (42 μL), (f) HQ (60 μL)+AA (56 μL).

Here, the mixture of hydroquinone (HQ) and ascorbic acid (AA) with contents of 0 and 70 μL, respectively, was not considered because the yield of the Au nanorods was very low.

Referring to FIG. 4, the uniformity of the Au nanorods was decreased as the content of ascorbic acid (AA) was increased from 0 to 56. The Au nanorods having high aspect ratios of hundreds of nanometers were observed from TEM analysis as shown in FIGS. 4(a)-(f). This result confirms that the aspect ratio of the Au nanorods can be improved by controlling the reducing power of the reducing agent during the growth step. This result is also consistent with FIG. 1 and the UV-Vis NIR absorption spectra of FIGS. 2A-2C. However, this result is not consistent with the expectation that the increase of ascorbic acid (AA) will not provide sufficient time for growth of Au nanorods by quickly reducing $Au^{3+}$ to $Au^+$.

Figure 5:
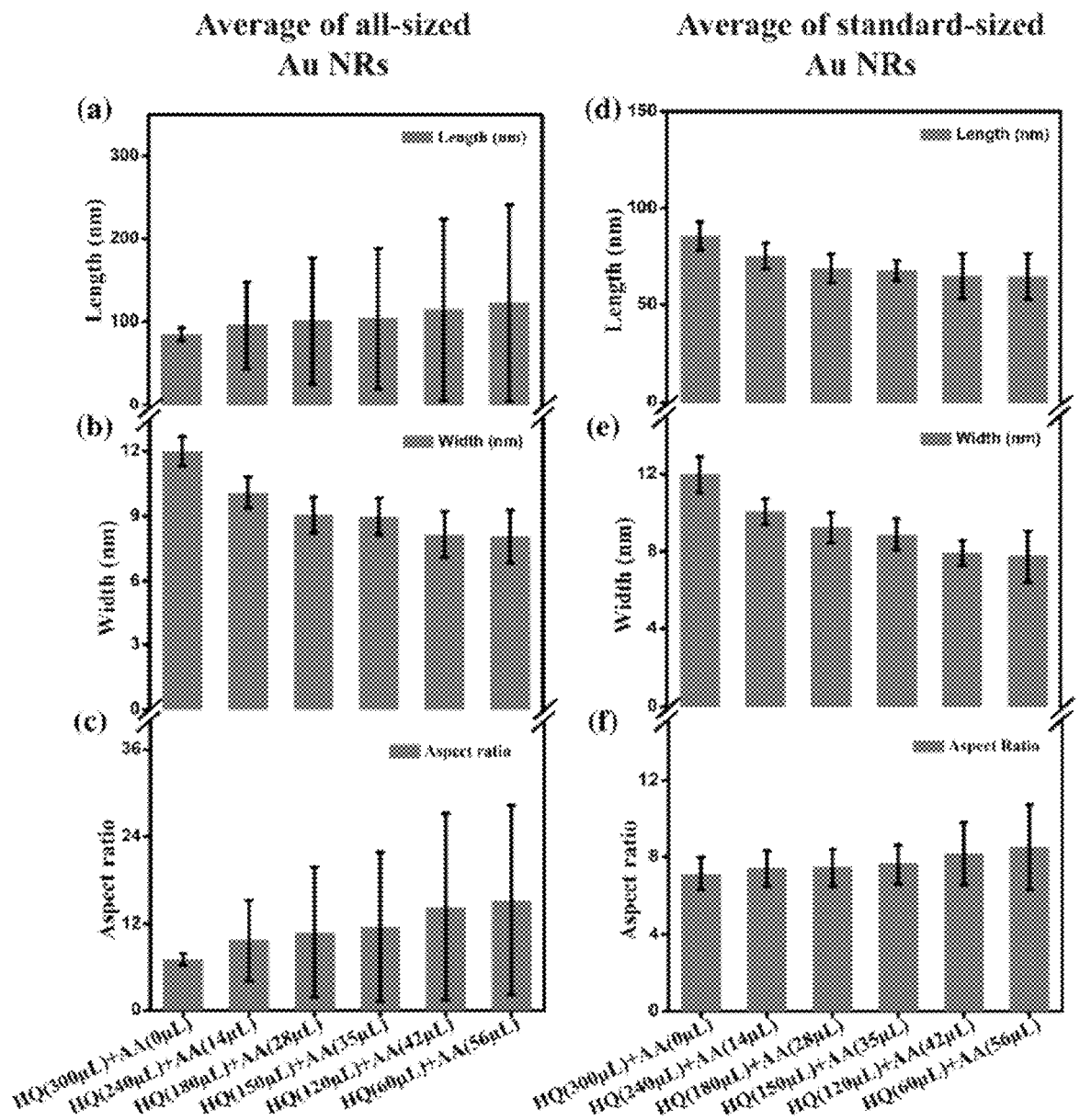
FIG. 5 shows the average (a) length, (b) width and (c) aspect ratio of all-sized gold nanorods, and the average (d) length, (e) width, (f) aspect ratio of standard-sized gold nanorods.

FIG. 5 shows the average (a) length, (b) width and (c) aspect ratio of all-sized gold nanorods, and the average (d) length, (e) width, (f) aspect ratio of standard-sized gold nanorods.

The average length, width and aspect ratio of all-sized gold nanorods prepared using mixtures of AA and HQ at different contents, HQ (300 μL)+AA (0 μL), HQ (240 μL)+AA (14 μL), HQ (150 μL)+AA (28 μL), HQ (120 μL)+AA (35 μL) and HQ (60 μL)+AA (56 μL), are shown in FIGS. 5(a)-(c). The average length and aspect ratio of the Au nanorods were increased as the content of ascorbic acid (AA) was increased. However, the error bars were also increased gradually, which suggests faster growth rate and decreased uniformity.

The average length, width and aspect ratio of standard-sized Au nanorods except for the Au nanorods with exceptional lengths prepared by mixing ascorbic acid (AA) and hydroquinone (HQ) at different contents are shown in FIGS. 5(d)-(f).

The average length and diameter of the Au nanorods were decreased as the content of ascorbic acid (AA) was decreased and the content of hydroquinone (HQ) was increased (FIGS. 5(d)-(e)). That is to say, in the presence of the two reducing agents, ascorbic acid (AA) with a relatively stronger reducing power reduces Au ions faster than hydroquinone (HQ). Accordingly, the Au reduced by ascorbic acid (AA) was grown preferentially on seed particles and ascorbic acid (AA) was consumed faster.

Consequently, the content of ascorbic acid (AA) in the growth solution was not sufficient to reduce all the Au ions. Accordingly, only a small number of seed particles were grown into nanorods initially and the remaining Au ions not reduced by ascorbic acid (AA) were reduced slowly by hydroquinone (HQ). After that, the remaining seed particles were grown into nanorods. Accordingly, when both the reducing agents are present in the Au nanorod growth solution, some Au ions are reduced preferentially by ascorbic acid (AA) having a relatively stronger reducing power and the remaining Au ions are reduced slowly by hydroquinone (HQ). As a result, relatively long Au nanorods are grown.

As a consequence, the reducing rate of the Au ions was increased as the content of ascorbic acid (AA) was increased and, as a result, the average length and diameter of standard-sized Au nanorods were decreased (FIGS. 5(d)-(f)) and the number of the remaining seed particles was decreased relatively. Since relatively more reduced Au is attached to the seed particles as the number of the seed particles is decreased, the average length of the Au nanorods is increased.

Figure 6A:
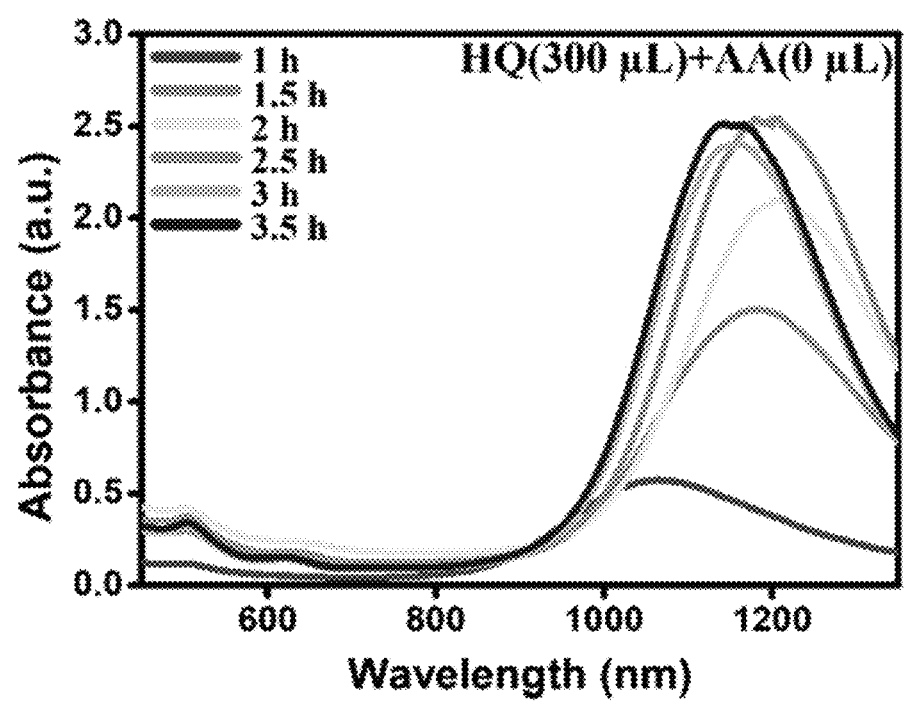
FIG. 6A shows the change in the UV-Vis-NIR absorbance spectra of gold nanorods during growth when the contents of hydroquinone (HQ) and ascorbic acid (AA) are HQ (300 μL)+AA (0 μL)
Figure 6B:
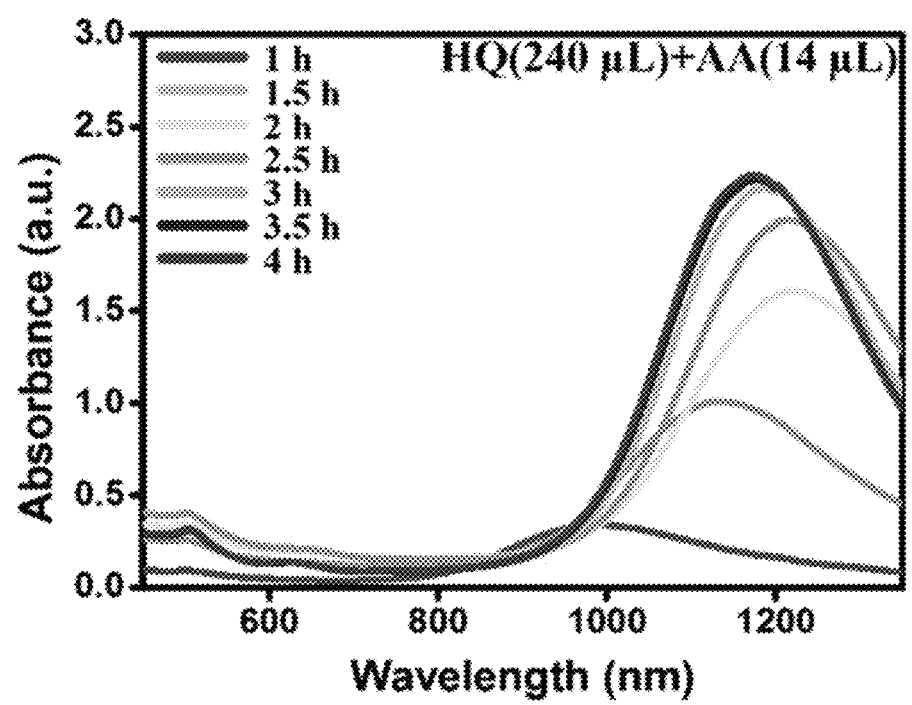
FIG. 6B shows the change when the contents of hydroquinone (HQ) and ascorbic acid (AA) are HQ (240 μL)+AA (14 μL)
Figure 6C:
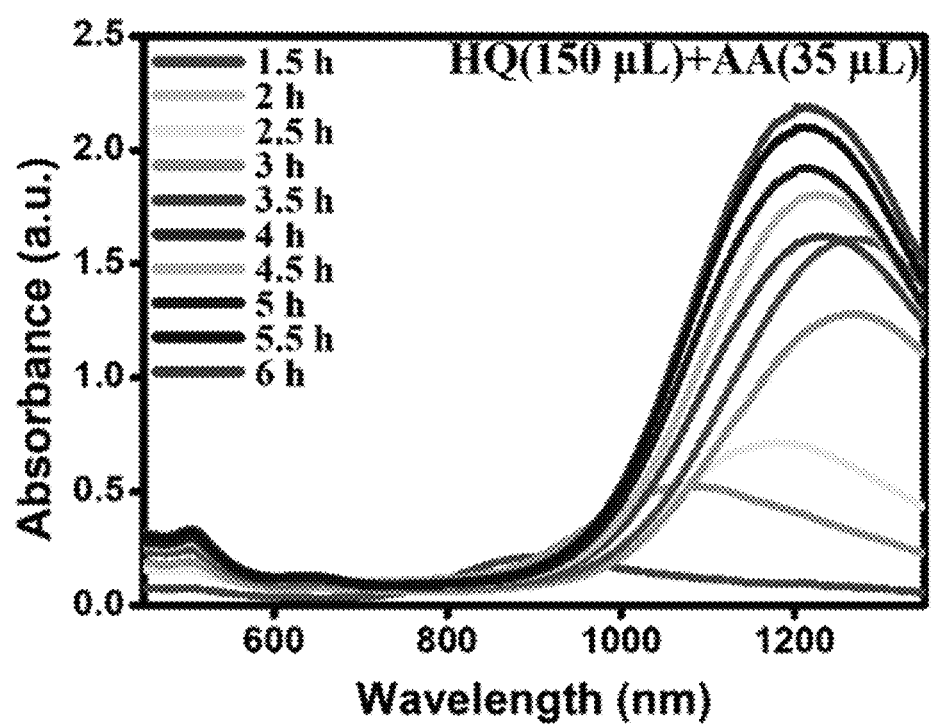
FIG. 6C shows the change when the contents of hydroquinone (HQ) and ascorbic acid (AA) are HQ (150 μL)+AA (28 μL)
Figure 6D:
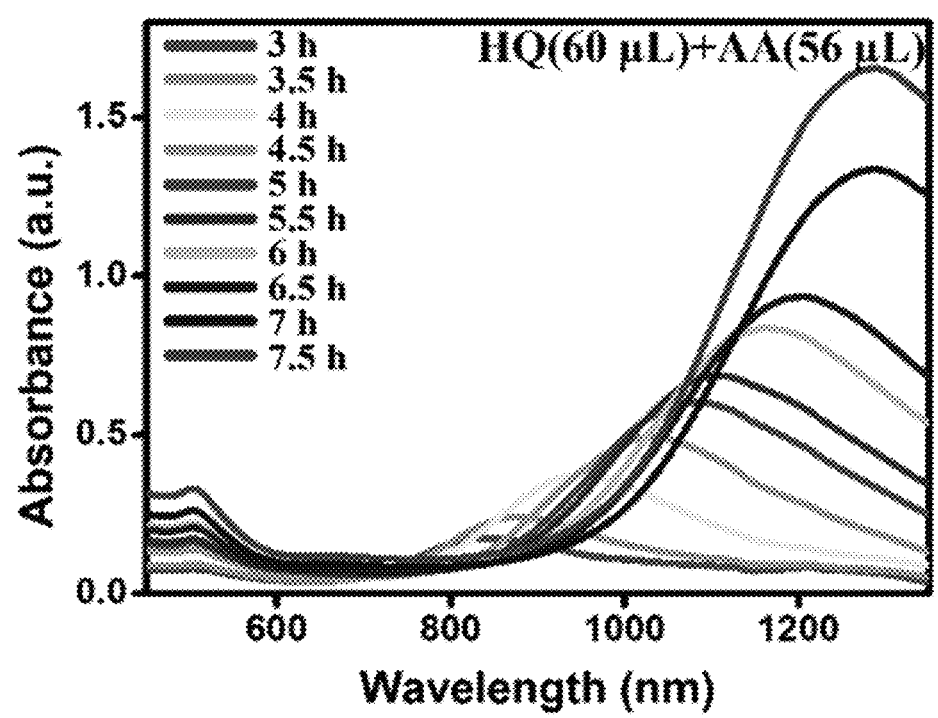
FIG. 6D shows the change when the contents of hydroquinone (HQ) and ascorbic acid (AA) are HQ (60 μL)+AA (56 μL)
Figure 6E:
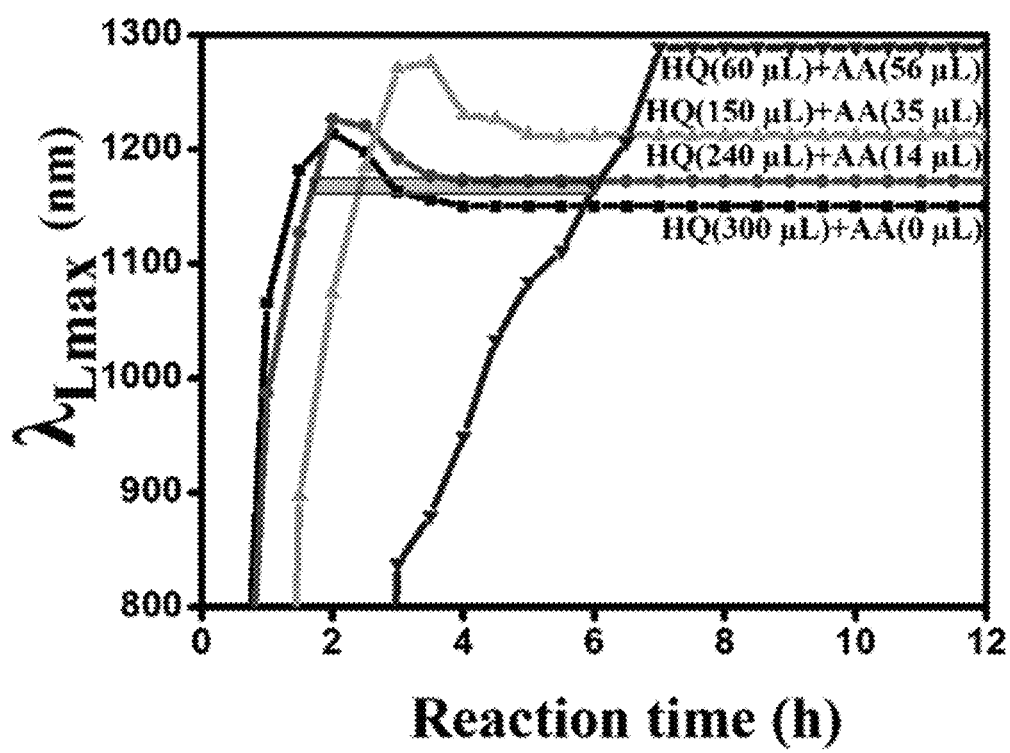
FIG. 6E shows $\lambda_{Lmax}$ with respect to reaction time.

FIG. 6A shows the change in the UV-Vis-NIR absorbance spectra of the gold nanorods during growth when the contents of hydroquinone (HQ) and ascorbic acid (AA) are HQ (300 μL)+AA (0 μL), FIG. 6B shows the change when the contents of hydroquinone (HQ) and ascorbic acid (AA) are HQ (240 μL)+AA (14 μL), FIG. 6C shows the change when the contents of hydroquinone (HQ) and ascorbic acid (AA) are HQ (150 μL)+AA (28 μL), FIG. 6D shows the change when the contents of hydroquinone (HQ) and ascorbic acid (AA) are HQ (60 μL)+AA (56 μL), and FIG. 6E shows λLmax with respect to reaction time.

Referring to FIGS. 6A-6D, the reaction time was 3, 3.5, 5.5 and 7.5 hours, respectively, when the contents of hydroquinone (HQ) and ascorbic acid (AA) were 300 μL and 0 μL (FIG. 6A), 240 μL and 140 μL (FIG. 6B), 150 μL and 28 μL (FIG. 6C), and 60 μL and 56 μL (FIG. 6D).

As shown in FIGS. 5(a) and (c), the average length and aspect ratio of Au nanorods were increased as the content of hydroquinone (HQ) was decreased. Because longer time is necessary to obtain longer Au nanorods, the length was the largest when the contents of hydroquinone (HQ) and ascorbic acid (AA) were 60 μL and 56 μL, respectively (FIG. 6D).

Hydroquinone (HQ) is a weaker reducing agent than ascorbic acid (AA), with the standard reduction potentials of hydroquinone (HQ) and ascorbic acid (AA) being 0.714 V and −0.081 V, respectively. Ascorbic acid (AA) has a $pK_a$ value of 4.12 and hydroquinone (HQ) has a $pK_a$ value of 9.96. Because ascorbic acid (AA) is a relatively stronger acid with a lower $pK_a$ value, it releases $H^+$ and electrons better than hydroquinone (HQ). This means that ascorbic acid (AA) has a stronger reducing power than hydroquinone (HQ).

The growth mechanism of Au nanorods is as follows. Au particles reduced by a reducing agent in a growth solution are attached isotropically to seed particles and grow into Au nanorods. Hydroquinone (HQ) having a relatively weaker reducing power reduces Au ions slowly, and the reduced Au particles grow slowly on the seed particles. Therefore, sufficient growth time is provided for increase of the length and diameter of Au nanorods. Accordingly, when hydroquinone (HQ) is used in combination with ascorbic acid (AA) of an amount insufficient to reduce Au ions, the dimension of Au nanorods such as aspect ratio, etc. may be controlled with the ratio and content of the reducing agent.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for preparing gold (Au) nanorods using a reducing agent mixture, comprising:
   a step of preparing a seed solution comprising seed particles of gold nanoparticles; and
   a step of growing seeds of the gold nanoparticles into nanorods by adding a growth solution comprising ascorbic acid (AA) and hydroquinone (HQ) to the prepared seed solution,
   wherein the ascorbic acid first reduces the seeds of the gold nanoparticles and the amount of the ascorbic acid (AA) is insufficient to reduce all gold ions in the seed particles.

2. The method for preparing gold nanorods of claim 1, wherein gold ions in the seed particles react with and consume the ascorbic acid, followed by reduction of the remaining gold ions by the hydroquinone.

3. The method for preparing gold nanorods of claim 1, wherein a negative correlation exists between an aspect ratio of the gold nanorods and the amount of hydroquinone in the growth solution.

4. The method for preparing gold nanorods of claim 1, wherein the seed solution is a solution in which the seeds are formed by adding $HAuCl_4$, CTAB and $NaBH_4$.

5. The method for preparing gold nanorods of claim 3, wherein the aspect ratio of the gold nanorods is higher than that of the gold nanorods grown by using ascorbic acid or hydroquinone alone.

* * * * *